United States Patent
Kim et al.

(10) Patent No.: US 6,175,718 B1
(45) Date of Patent: *Jan. 16, 2001

(54) APPARATUS AND METHOD FOR CONTROLLING VIEWING OF VIDEO SIGNALS

(75) Inventors: Do Hyun Kim, Seoul; Myeong Joon Kang, Songtan, both of (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/812,136

(22) Filed: Mar. 5, 1997

(30) Foreign Application Priority Data

Mar. 5, 1996 (KR) .................................................. 96-5721

(51) Int. Cl.[7] ................ H04H 1/00; H04N 7/10
(52) U.S. Cl. ................ 455/6.2; 348/5.5; 348/10
(58) Field of Search .............................. 455/3.1, 4.1, 4.2, 455/6.1, 6.2, 6.3; 348/5.5, 6, 10.9; 380/9, 10, 20; H04N 7/00, 7/10

(56) References Cited

U.S. PATENT DOCUMENTS

| | | | |
|---|---|---|---|
| 4,930,158 | * 5/1990 | Vogel | 380/5 |
| 4,930,160 | * 5/1990 | Vogel | 380/23 |
| 5,371,795 | * 12/1994 | Vogel | 380/23 |
| 5,485,518 | * 1/1996 | Hunter et al. | 380/20 |
| 5,550,575 | * 8/1996 | West et al. | 348/5.5 |
| 5,583,576 | * 12/1996 | Perlman et al. | 348/10 X |
| 5,758,258 | * 5/1998 | Shoff et al. | 455/5.1 |
| 5,828,402 | * 10/1998 | Collings | 348/5.5 |

* cited by examiner

*Primary Examiner*—John W. Miller (57) ABSTRACT

An apparatus and method for controlling viewing of video programs. The apparatus includes a signal unit for receiving and processing a video signal, a decoding unit for decoding a grade code of a video program contained in the video signal, a key input unit for receiving control data from a user wherein the control data includes a secret number, a storage unit for prestoring a grade code and a secret number, and a control unit for comparing the decoded grade code with the prestored grade code, comparing the secret number inputted to the key input unit with the prestored secret number if the decoded grade code matches the prestored grade code, and outputting the video signal to the user if the secret numbers match.

31 Claims, 7 Drawing Sheets

APPARATUS AND METHOD FOR CONTROLLING VIEWING OF VIDEO SIGNALS

BACKGROUND OF THE INVENTION

This invention is related to the video machinery, especially having an apparatus for limiting a watching of video machinery and methods of limiting a watching using thereof, wherein the apparatus and methods are to use video signal having a certain grades.

The methods of limiting a watching of traditional video machinery are divided into three, as described hereinafter.

Figure 1A:
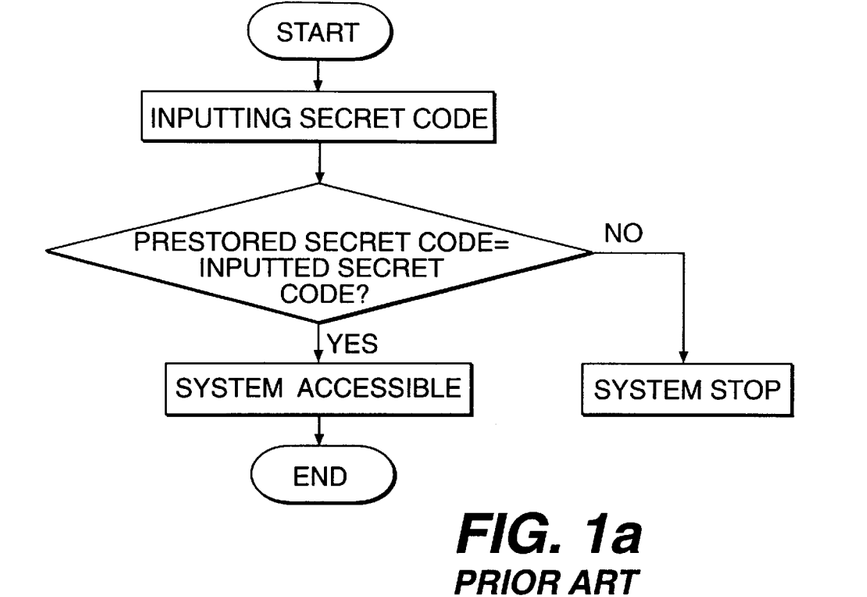
FIG. 1a, 1b, 1c are flowchart showing the method of limiting a watching according to the traditional video machinery.

Firstly, it is to put the limitation on video set itself. Such method is described in Korea patent application No.87-15449 filed by applicant of the present invention. As shown in a flowchart of FIG. 1a of that patent application. After turn on the source of electric power, it is set up that the secret code must be inputted when in order to use the apparatus otherwise the apparatus is unable to be used by the customer.

Figure 1B:
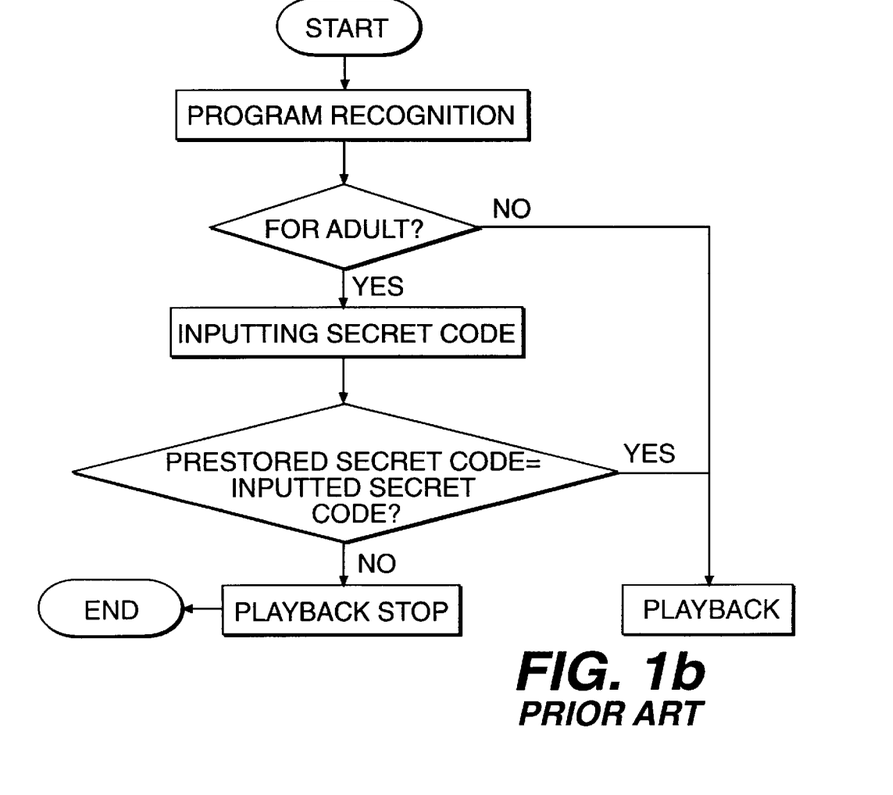

Secondly, as shown in a flowchart of FIG. 1b, the set recognizing the program selected by an user. If a program being selected through user display is not an adult program, the set is in playback state, on the other hand, in case where the selected program is an adult program, the set is comparing the inputted code with originally set up secret code. If two codes are matching, the set goes into a playback state, while the set is not in function when two codes are not identical.

Figure 1C:
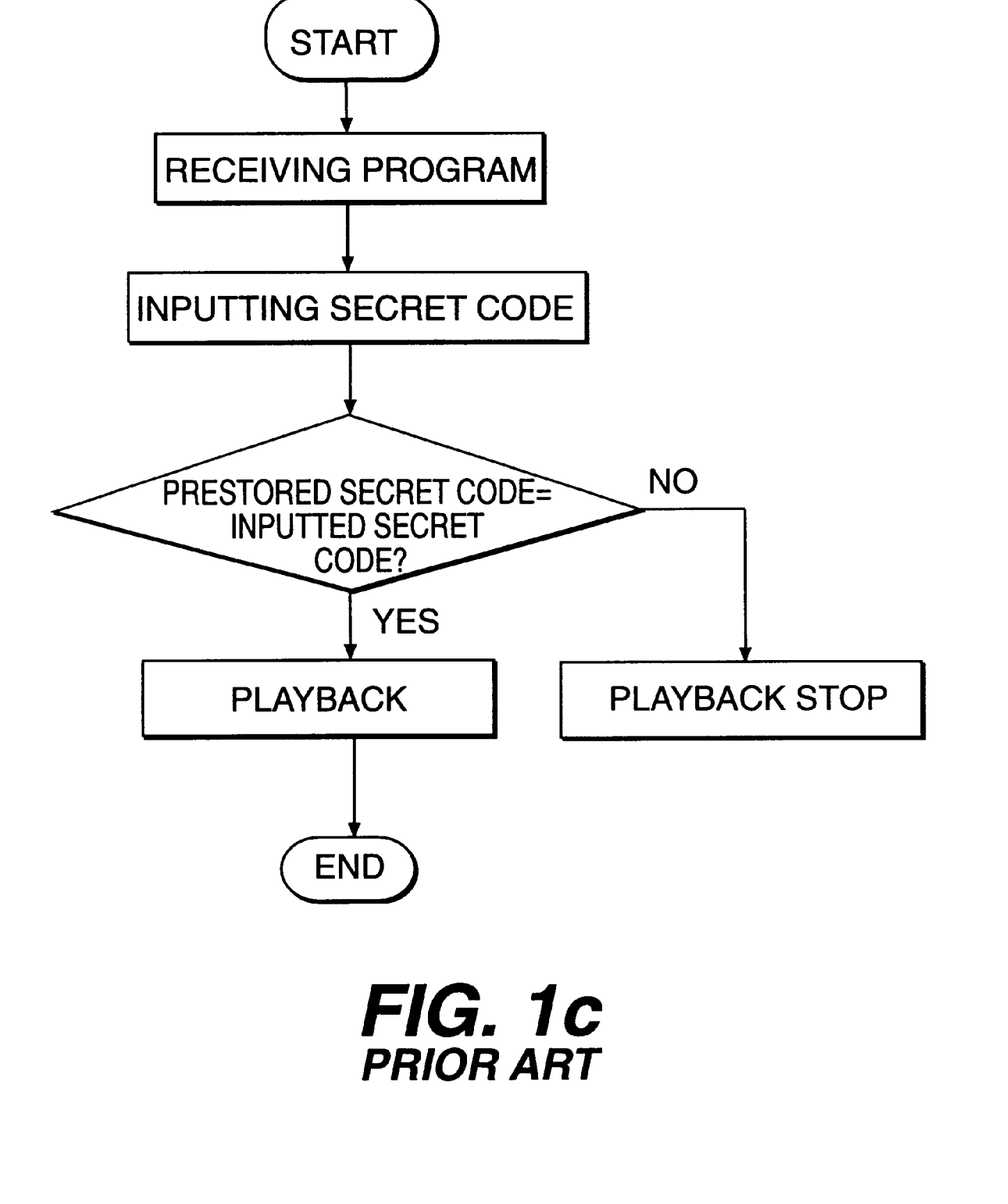

Thirdly, a method described in Korea patent application No.90-5219 by same applicant of the present invention, as shown in a flowchart of FIG. 1c, when the user input the code for each program, respectively, if they are identified as identical, namely, inputted secret code and originally created secret code are same, the set playbacks the program, while the set is not in function when two codes are not identical.

But, in the prior art previously discussed, some problems have been arisen such that it is impossible to selectively watch by the user because the use of the set itself is limited.

Also, the second prior art has another problem as described hereinafter, if the user display is not provided or if it is broken, or the user display is changed by the user, it is impossible to limit a watching to other viewer.

And the third one has a disadvantage that the user himself must input every secret codes for each program, respectively.

SUMMARY OF THE INVENTION

The present invention has been made to solve the foregoing problems of the prior arts as described above.

It is therefore an object of the present invention to provide an apparatus for a watching of video machinery and method of limiting a watching using thereof, so as to limit a watching corresponding to the program and classification of the user by limiting a watching for the certain program only in accordance with the grade of classified program.

It is another object of the present invention to provide an apparatus for a watching of video machinery and method of limiting a watching using thereof, so as to limit a watching without the user display being provided to outer of cassette by limiting a watching for the certain program only in accordance with the grade classified program.

It is still another object of the present invention to provide an apparatus for a watching of video machinery and method of limiting a watching using thereof, so as to limit a watching without inputting secret code for each program whereby the secret code is inputted to the set corresponding to program only with classified grade.

To achieve this object as described above, an apparatus for limiting a watching in accordance with the present invention comprising a signal input unit for inputting the video signal, a grade code decoding unit for decoding the grade code of program which is prerecorded in one part of the inputted video signal, and a signal output unit for outputting the signal from signal input unit or other signal which is selected by the signal output unit, and a control unit for controlling the overall process and for inhibiting the execution of predetermined function of video machinery when the grade is matching with the result obtained after comparing the program grade code decoded by the grade code decoding unit with preset grade, and a key input unit for sending the order to the control unit to conduct the function of itself.

A method of limiting a watching of video machinery in accordance with the present invention is comprised the steps of inputting the video signal, decoding the grade code of program which is recorded in one part of the inputted video signal, and comparing the grade code decoded in the decoding step with originally set up grade, and inhibiting the execution of predetermined function of the set if the decoded code is matching with the fixed code.

BRIEF DESCRIPTION OF THE DRAWINGS

These and other objects and many of the attendant advantages of the present invention will be readily appreciated as the same becomes better understood by reference to following detailed description when considered in connection with accompanying drawings, in which like reference numerals denoted the same parts throughout the figures and wherein.

DETAILED DESCRIPTION OF THE INVENTION

Now, a preferred embodiment of the present invention is discussed hereinafter with reference to the accompanying drawings.

Figure 2:
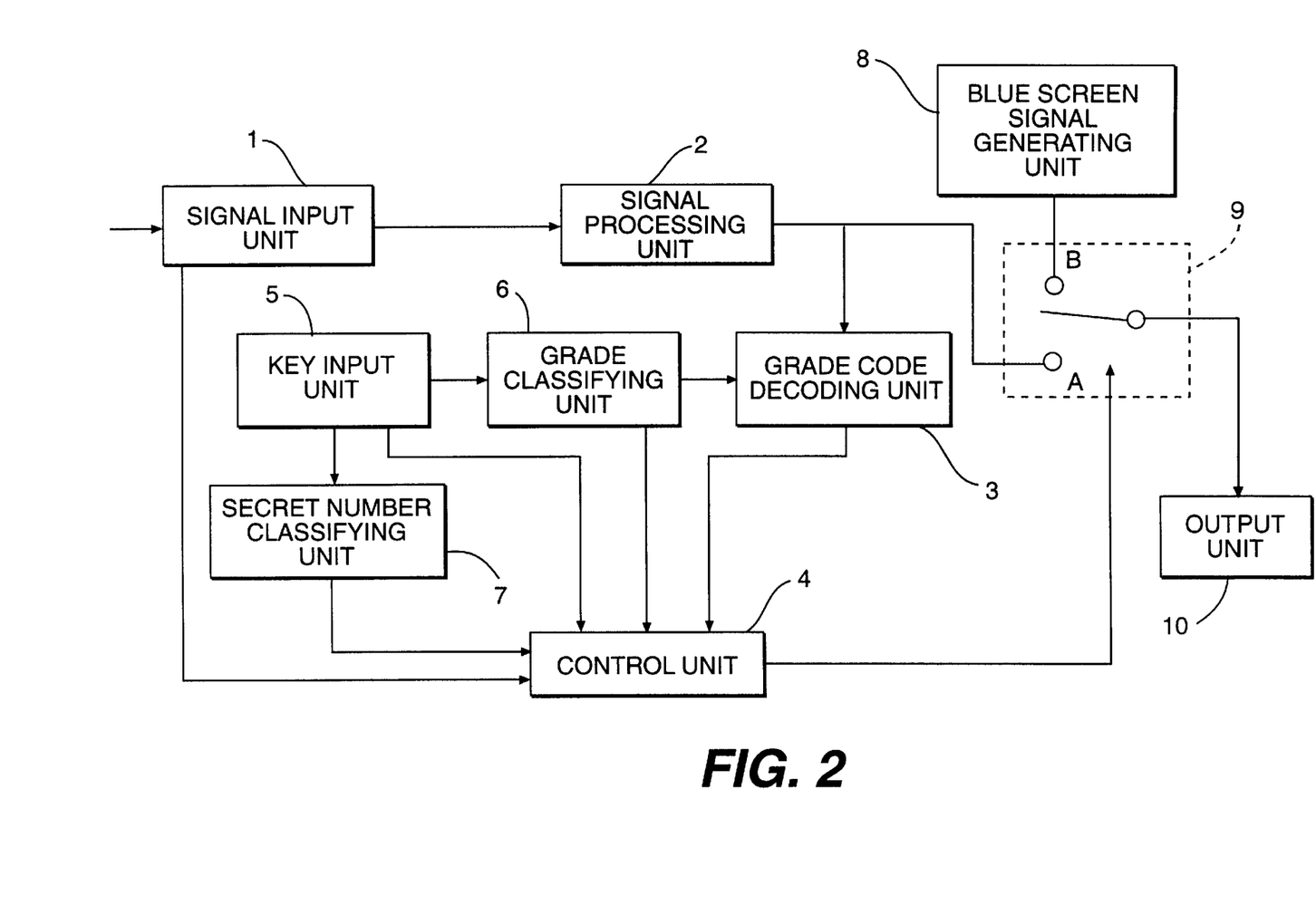
FIG. 2 is a block diagram showing the construction of the apparatus for limiting a watching of video machinery according to the present invention.

Referring to FIG. 2, there is illustrated a block diagram showing the construction of the apparatus for limiting a watching of video machinery according to the present invention, the apparatus comprising the signal input unit 1 for inputting the video signal, a signal process unit 2 for proceeding the output signal from the signal input unit 1, and the grade code decoding unit 3 for decoding the grade code of program which is recorded in a part of video signal outputted from the signal process unit 2, and the control unit 4 for inhibiting the execution of predetermined function of the set when the grade is matching with the result obtained after comparing the program code decoded by the grade code decoding unit with preset grade. And the control unit 4 is also control overall process too. Further, the key input unit 5 for accomplishing the input of key to control the movements of the control unit 4, and a grade classifying unit 6 for recording the grade of program that is classified by inputting of key code from the key input unit 5, and a secret code unit 7 for recording the secret number that is decided by inputting of key code from the key input unit 5, and a blue screen signal generating unit 8 for generating a blue screen, and a switching unit 9 for outputting an output from the signal process unit 2 or an output selected from the blue screen signal generating unit 8, by the control following the output of the control unit 4, and a signal output unit 10 for outputting a last signal, which is selected by the switching unit 9.

The movement of the apparatus for limiting a watching in accordance with the present invention is discussed hereinafter.

The video signal inputted through the signal input unit 1 is inputted to the grade code decoding unit 3 and the switching unit 9 through the signal process unit 2, the grade code decoding unit 3 has a function to input the decoded grade code to the control unit 4 after the grade code decoding unit 3 decodes the grade code of program recorded in one part of video signal.

Further, the control unit 4 is comparing the preset up grade in the grade classifying unit 6 with the grade decoded from the grade code decoding unit 3, and the secret number is inputted to the control unit 4 from the key input unit 5 when decoded grade code is matching with the fixed grade code.

If the secret number inputted from the key input unit 5 and secret number originally set up in the secret number classifying unit 7 are identical, the control unit 4 is leading the switching unit 9 to be switched to terminal A and outputs the video signal from the signal process unit 2 to the signal output unit 10. While, if the secret number inputted from the key input unit 5 and the secret number originally set up in the secret number creating unit 7 are not matching, the control unit 4 is leading the switching unit 9 to be switched to terminal B and dose not output the video signal from the signal process unit 2 but, it dose output a blue screen signal generated from the blue screen signal generating unit 8 to the signal output unit 10 through the switching unit 9.

Also, when the two codes are not matching after comparing the grade code decoded in the grade code decoding unit 3 with the originally set up grade, the control unit 4 is leading the switching unit 9 to be switched to the terminal A, and outputs the video signal from the signal process unit 2 to the signal output unit 10.

Now, the idea as previously discussed is explained in detail with reference to the embodiment.

In case where if the user is classifying the 5 or higher grade in order to limit the watching by setting up 5 or higher grade in grade classifying unit 6, the control unit 4 is outputting the video signal without inputting the secret number when the compared data shows that the grade is not 5 or higher. It is, however, to note that if the program grade inputted is matching with the grade originally set up by the user, the control unit is controlling the set in two different ways. One is that the original video signal is outputted in case where the secret number inputted by the user and originally set up secret number are matching, and the other is that the blue screen generating signal and another signals are outputted in case where the two secret numbers are not matching.

The present invention as previously described is discussed hereinafter in detail with reference to the accompanying FIG. 3 to FIG. 7.

Figure 3:
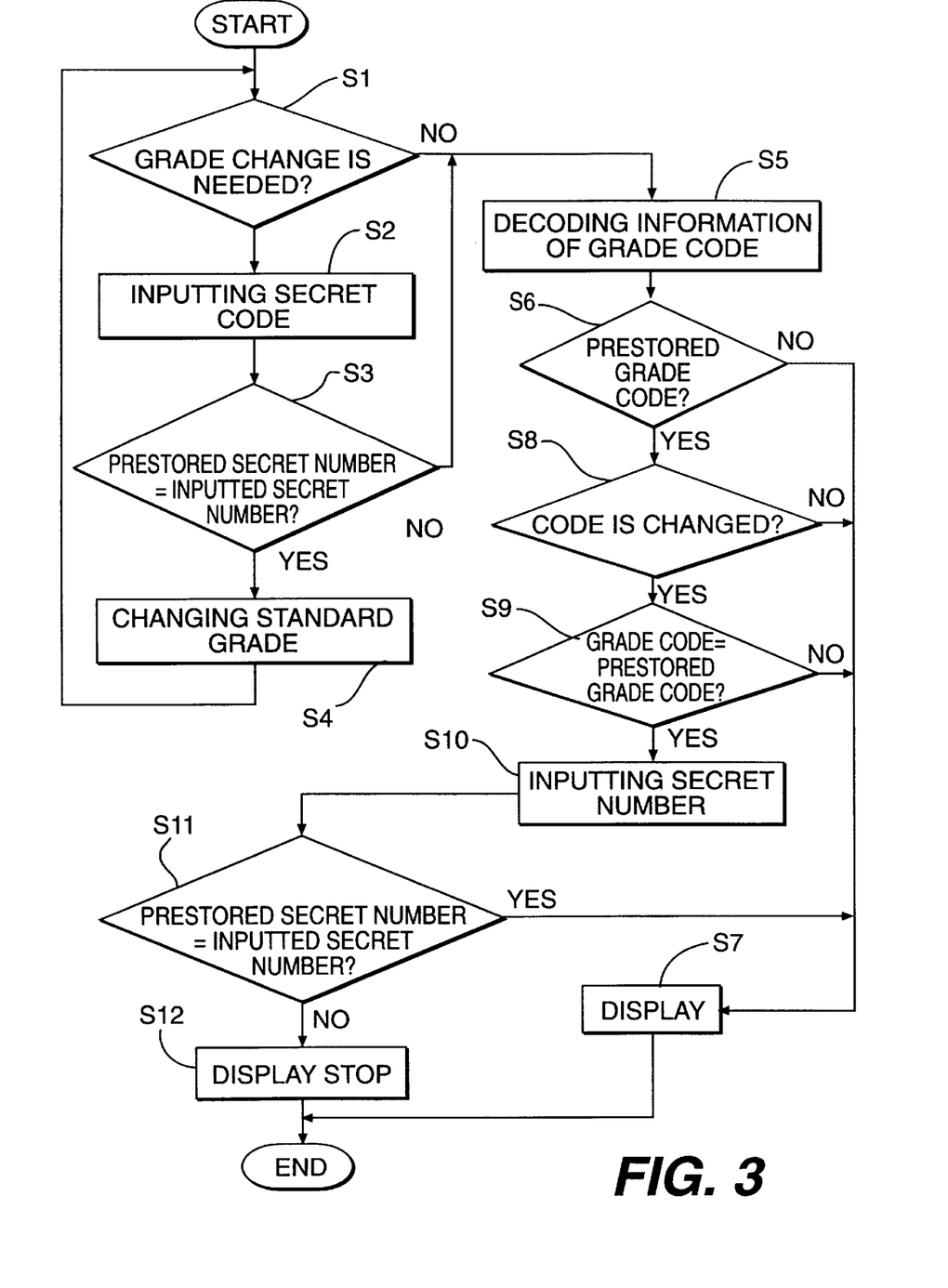
FIG. 3 is a flowchart showing the method of limiting a watching to which the embodiment of the present invention is applied.

Referring to FIG. 3, it is illustrated that the watching of program is limited only when the inputted grade of program is matching by requiring the input of secret number.

When the control unit 4 perceives a signal that the user demands the change of grade(hereinafter abbreviated as "changing signal") by the key input unit 5, and the changing signal is inputted, the control unit 4 changes the originally set up grade into a new grade only when the inputted secret number and the originally set up secret number are matching (S1 to S4). On the other hand, if the changing signal is not inputted, the grade classifying code informations in video signal of program read by grade code decoding unit 3 is transmitted to the control unit 4(S5). The control unit 4 is decoding as to whether the grade code decoded by the grade code decoding unit 3 is the fixed code or not, and if the decoded code is different from fixed code, the control unit 4 is leading the switching unit 9 to be switched to the terminal A and output the original video signal to the output unit 10 without watching limitation(S6, S7). But if the decoded code is matching with the fixed code, the control unit 4 is checking whether the program is new or whether the grade code is changed by changing the channel, And, the control unit 4 output the video signal outputted from the signal process unit 2 when there has been no change of grade code(S8, S7). In addition, in case where the grade code of the signal decoded in the grade code decoding unit 3 is not the fixed code originally set up by the user, the control unit 4 output the original video signal outputted from the signal process unit 2 without watching limitation(S9, S7).

If the decoded signal in grade code decoding unit 3 is matching with the fixed code, the user required to input the secret number. In case where the inputted secret number and the originally set up secret number are matching, the control unit 4 outputs the program to the output unit 10(S10, S11, S7). On the other hand, in case where the two secret numbers are not identical, the control unit 4 does not outputs the normal(original) video signal but the changed screen, for instance, the blue screen which generated by the blue screen signal generating unit 8, therefore the watching limitation is realized(S12).

Figure 4:
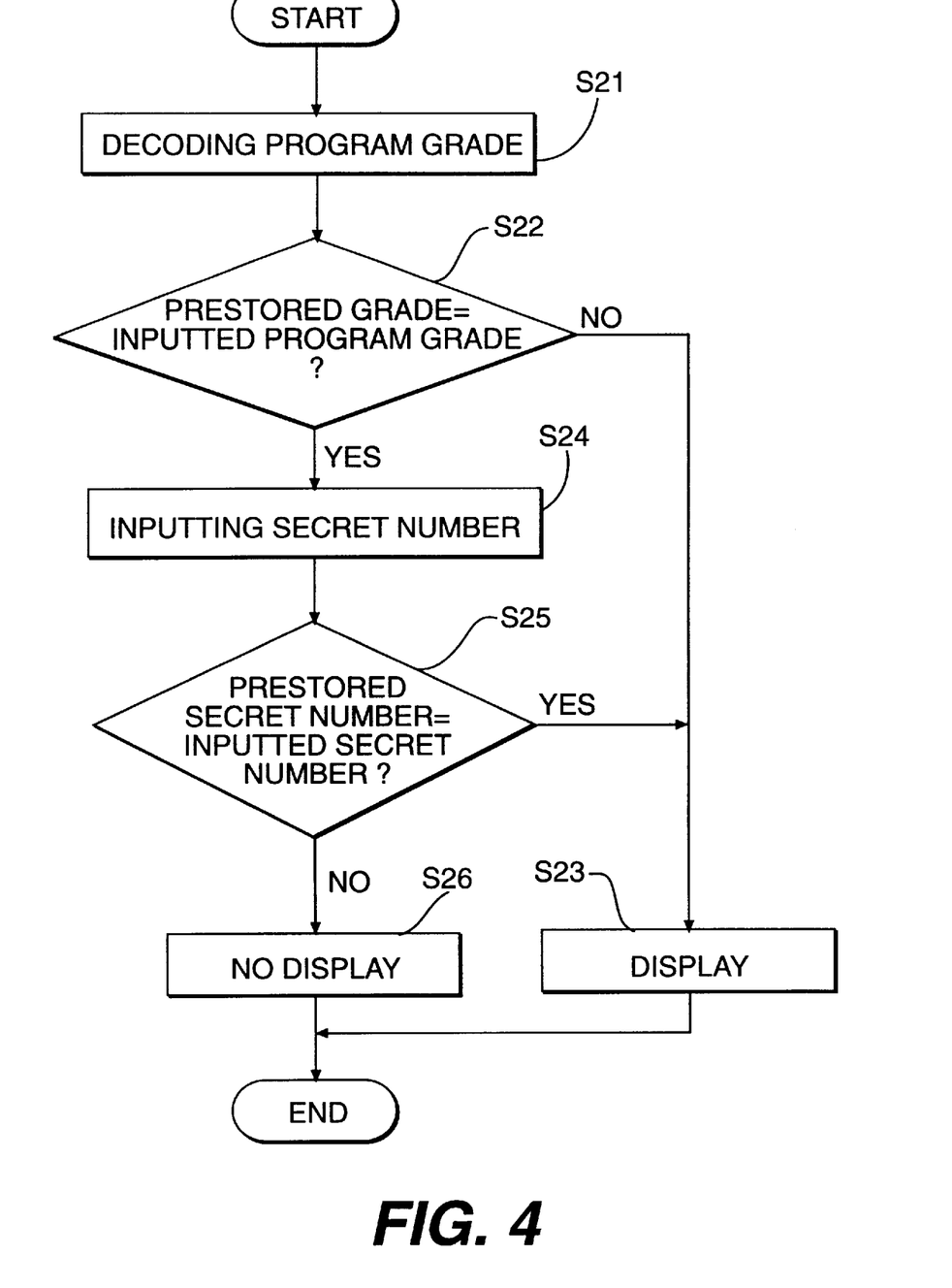
FIG. 4 is a flowchart showing the method of limiting a watching to which embodiment of the present invention is applied.

In addition, FIG. 4 is the flowchart showing the method of limiting the watching for the program having one grade, namely, the method is to control the outputting of the program having the originally set up grade only in case where the inputted grade of program and the originally set up grade are compared with each other.

When the grade code which is decoded in the grade code decoding unit 3 and the originally set up grade are compared with, if they are not matching, no watching limitation is available by the control unit 4(S21, S23). If they are identical, the user is required to input the secret number (S24) and in case where the inputted secret number and originally set up secret number are matching, the program is outputted to the output unit 10 by the control unit 4(S25, S23). It is, however, to note that when two secret numbers are matching, the control unit 4 outputs the normal(original) video signal but the changed screen, for instance the blue screen which generated by the blue screen signal generating unit 8, therefore watching limitation is realized(S26).

Figure 5:
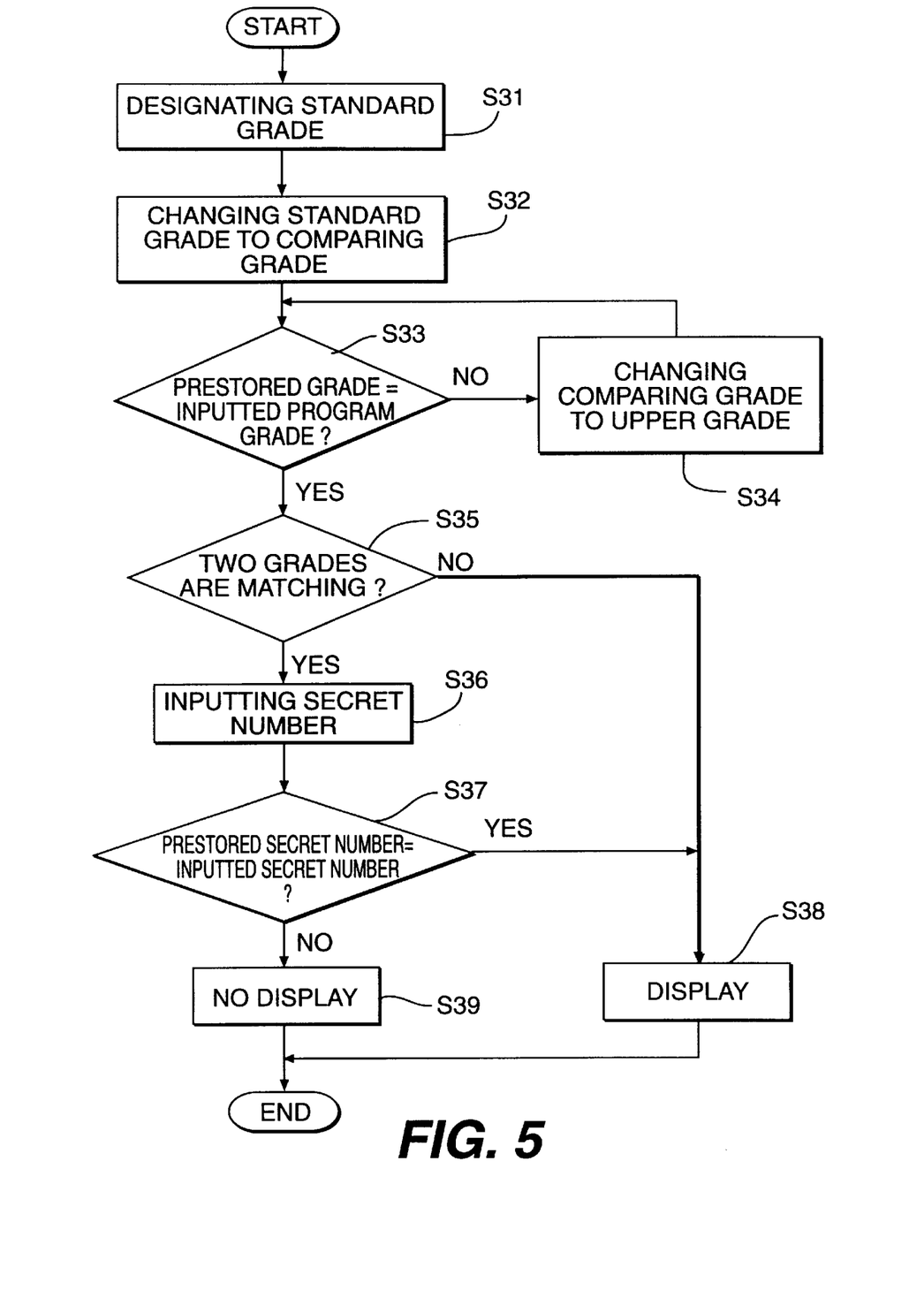
FIG. 5 is a flowchart showing the method of limiting a watching to which embodiment of the present invention is applied.

Also, FIG. 5 is the flowchart showing the method of the limiting the watching for program having grade larger than certain degree of grade.

Figure 6:
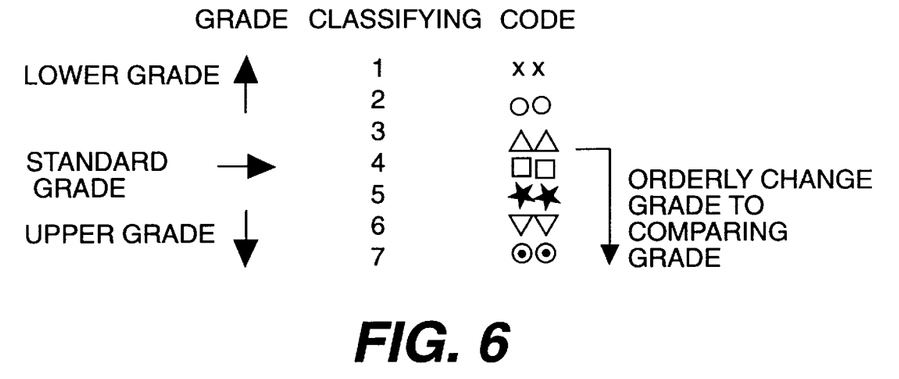
FIG. 6 is a drawing showing the change of comparative grade.

Here, the control unit is checking the grade of inputted program, and compares this grade with the originally set up standard grade and upper grade if there is no matching grade, the program is outputted. On the other hand, if there is matching grade the user is required to select the secret number. And the program is outputted only if the selected number is matching with originally set number. After the standard grade is designated, this grade changed into comparable grade. In this state, if the comparable grade is not identical to the inputted grade, the comparable grade is changed into an upper grade as shown in FIG. 6 (S31 to S34).

On the other hand, if the comparable grade and the inputted grade are identical, that is to say that two grades are same, the user is required to input the secret number and this is compared with the original secret number (S35 to S37).

After the comparison is completed, if the two secret numbers are identical, the control unit outputs the original program, and if the two secret numbers are not the same, it is not outputted(S38, S39). If there is no matching grade, the control unit outputs the original program without limitation (S38). Also, it is possible to set up that all upper grade is automatically installed.

Figure 7:
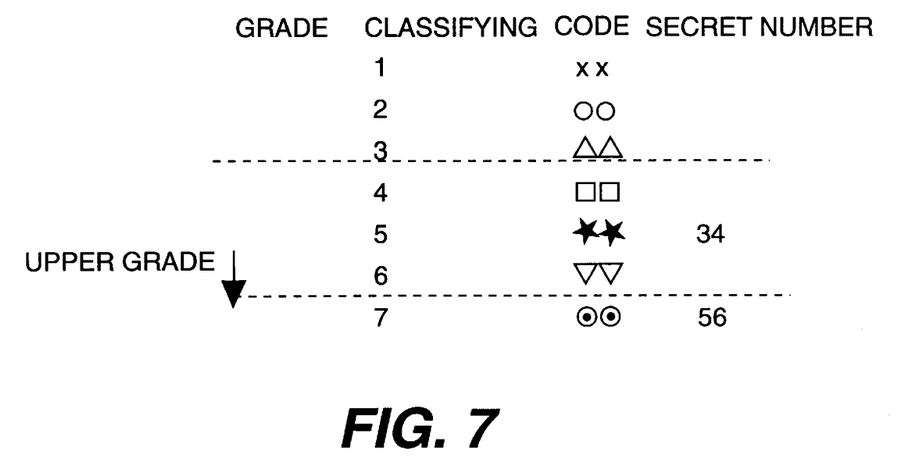
FIG. 7 represents the grade and code table to achieve the method of limiting a watching by secret number having plurality of steps according to the present invention.

FIG. 7 represents one example of controlling the set by the secret number which is divided into several steps according to grade of the program. One program having 1, 2, 3 grade is available to the whole family members including children. Another program having 4, 5, 6 grade is available to adults only, the third program having 7 grade is only available to the user.

In accordance with the present invention as discussed till now, many effects as described hereinafter can be accomplished.

First, it is possible to provide the selective watching system according to the program grade or user grade after comparing the grade of each program.

Second, it is possible not to disclose the secret personal information to third party by providing limited watching system according to the program and user classification.

Third, the discomfort such that the user must input the secret number for each program respectively will be removed, because the input of the secret number is only required when the inputted program grade and the originally set up grade are matching.

It should also be understood that the foregoing relates to only the scope of the invention is defined by the appended claims rather than by the description preceding them, and all changes that fall within meets and bounds are therefore intended to embraced by the claims.

What is claimed is:

1. An apparatus for controlling viewing of a video signal, comprising:
   a signal unit for receiving and processing a video signal;
   a decoding unit for decoding a grade code of a program contained in the video signal;
   a key input unit for receiving control data from a user; and
   a control unit for first comparing the decoded grade code output from the decoding unit with a prestored grade code, second comparing the control data received by the key input unit with a predetermined control data based on a result of the first comparison, and selectively outputting the video signal based on a result of the second comparison.

2. The apparatus of claim 1, further comprising:
   a message indicator screen signal generating unit for generating a message indicator screen signal, the message indicator screen signal being output when the control data received by the key input unit does not correspond with the predetermined control data.

3. The apparatus of claim 2, wherein the message indicator screen is a blue screen.

4. The apparatus of claim 1, further comprising:
   a switch for outputting the video signal from the signal unit when the control data received by the key input unit matches the predetermined control data, and outputting a blue screen signal when the control data does not match the predetermined control data.

5. The apparatus of claim 1, wherein the control data is a secret number.

6. The apparatus of claim 1, further comprising:
   a grade classifying unit for prestoring and modifying the prestored grade code based on a user's input.

7. The apparatus of claim 1, further comprising:
   a control data classifying unit for storing and modifying the predetermined control data.

8. The apparatus of claim 1, wherein the grade code represents rating information for the program.

9. A method for controlling viewing of a video signal, comprising:
   (a) receiving a video signal containing a vide program;
   (b) decoding a grade code of the video program;
   (c) comparing the decoded grade code of the video program with a prestored grade code;
   (d) comparing a control data inputted by a user with a predetermined control data based on a result of the comparing step (c); and
   (e) selectively outputting the video signal based on a result of the comparing step (d).

10. The method of claim 9, further comprising:
    (f) receiving a change signal from the user, the change signal representing the user's desire to change the prestored grade code.

11. The method of claim 10, further comprising:
    (g) requiring the user to input the user's control data; and
    (h) comparing the user's control data with the predetermined control data.

12. The method of claim 11, further comprising:
    (i) replacing the prestored grade code with a new prestored grade code based on a result of the comparing step (h).

13. The method of claim 9, further comprising;
    (f) generating and outputting a message indicator screen signal in lieu of the video signal based on the result of the comparing step (d).

14. The method of claim 13, wherein the message indicator screen is a blue screen.

15. The method of claim 9, wherein the control data corresponds to a secret number associated with the video program.

16. The method of claim 9, wherein the grade code represents rating information for the video program.

17. The method of claim 9, wherein in the comparing step (d), the user's control data is compared with the predetermined control data if the decoded grade code equals the prestored grade code.

18. The method of claim 17, wherein in the selectively outputting step (e), the video signal is output if the user's control data equals the predetermined control data.

19. The method of claim 18, wherein the control data is a number associated with the video program.

20. An apparatus for controlling viewing of a video signal, comprising:

a signal unit for receiving and processing a video signal;

a decoding unit for decoding a grade code of a program contained in the video signal;

a control unit for determining whether the grade code has been modified, for comparing the decoded grade code output from the decoding unit with a prestored grade code to selectively output the video signal, for comparing a control data with a predetermined control data, and for controlling an overall operation of a video machinery coupled to the apparatus; and a key input unit for receiving the control data and a modifying signal of the prestored grade code from a user.

21. The apparatus of claim 20, wherein a message indicator screen signal generating unit for generating a message indicator screen signal, the message indicator screen signal being output to the video machinery when the control data received by the key input unit does not correspond with the predetermined control data.

22. The apparatus of claim 21, wherein the control data is a secret number.

23. The apparatus of claim 21, further comprising:

a control data classifying unit for storing and modifying the predetermined control data.

24. The apparatus of claim 21, wherein the message indicator screen is a blue screen.

25. The apparatus of claim 21, further comprising:

a switch for outputting the video signal from the signal unit when the control data received by the key input unit matches the predetermined control data, and outputting the blue screen signal when the control data does not match the predetermined control data.

26. The apparatus of claim 20, further comprising:

a grade classifying unit for prestoring and modifying the prestored grade code based on a user's input.

27. The apparatus of claim 20, wherein the grade code represents rating information for the program.

28. A method for controlling viewing of video signal, comprising:

(a) receiving a video signal containing a video program;

(b) decoding a grade code of the video program;

(c) determining whether the grade code has been modified;

(d) comparing the decoded grade code of the video program with a prestored grade code and control data inputted by a user with a predetermined control data; and (e) selectively outputting the video signal based on a result of step (d).

29. The method of claim 28, wherein the determining step (c) includes:

(c1) receiving a change signal from the user, the change signal representing the user's desire to change the prestored grade code; and the method further comprising:

(f) requiring a user to input control data;

(g) comparing the user's inputted control data with a predetermined control data; and (h) replacing the prestored grade code with a new prestored grade code based on a result of the comparing step (g).

30. The method of claim 28, further comprising:

(f) generating and outputting an on screen signal in lieu of the video signal based on the result of the comparing step (d).

31. The method of claim 30, wherein the control data corresponds to a secret number.

* * * * *